Dec. 20, 1932. M. OKOCHI ET AL 1,891,831
MACHINE FOR MANUFACTURING TWIST DRILLS
Filed Sept. 24, 1929   2 Sheets-Sheet 1
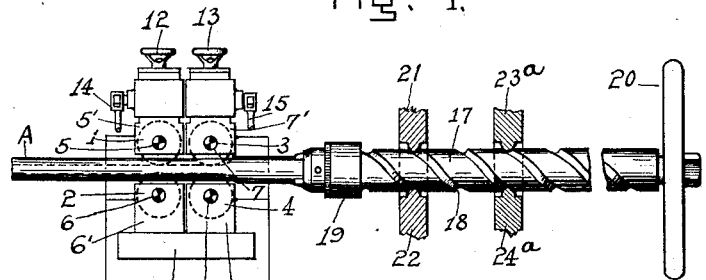
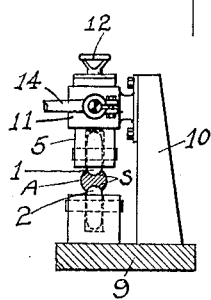
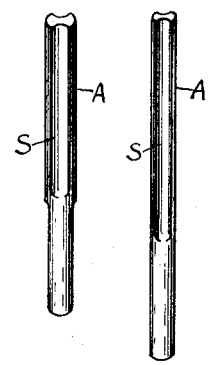
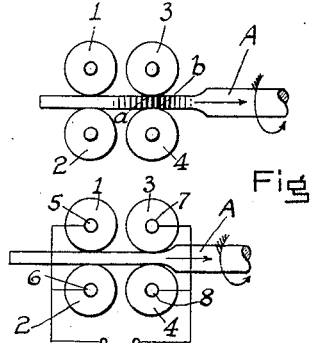
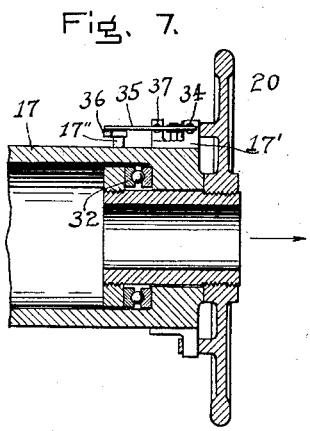
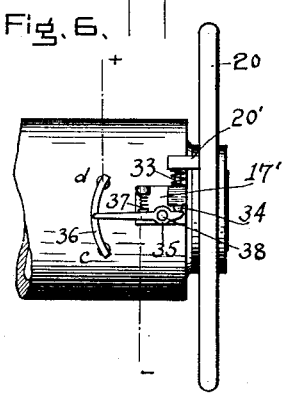
Inventors
M. Okochi and M. Okoshi
By Attorneys
Marks & Clerk Dec. 20, 1932.   M. OKOCHI ET AL   1,891,831
MACHINE FOR MANUFACTURING TWIST DRILLS
Filed Sept. 24, 1929   2 Sheets-Sheet 2
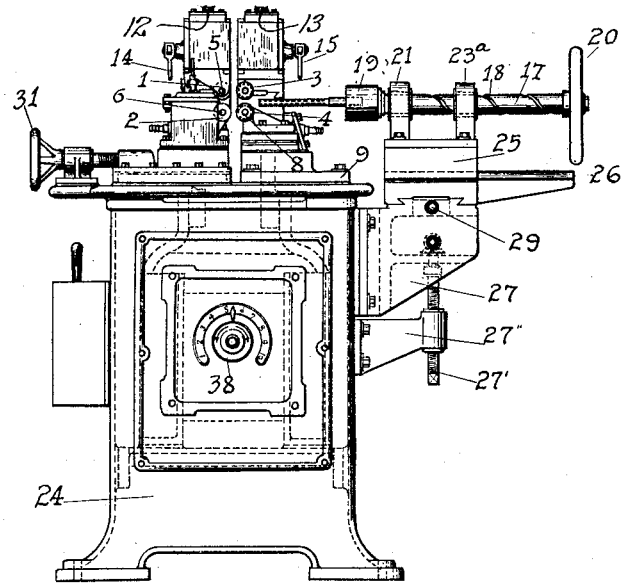
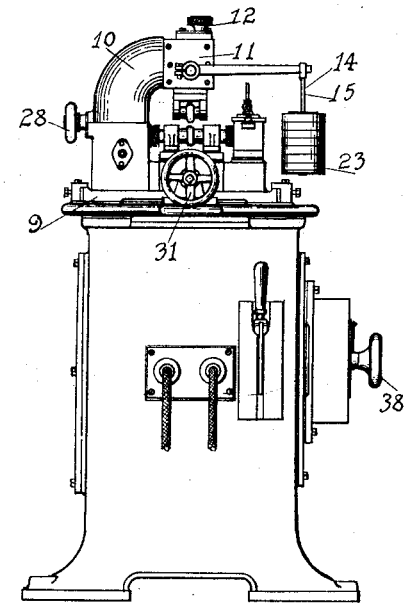
Inventors
M. Okochi and M. Okoshi
By Attorneys
Marks Clerk Patented Dec. 20, 1932

1,891,831

UNITED STATES PATENT OFFICE

MASATOSI OKOCHI, OF TOKYO, AND MAKOTO OKOSHI, OF TOKYO PREFECTURE, JAPAN, ASSIGNORS TO ZAIDAN HOJIN RIKAGAKU KENKYUJO, OF TOKYO, JAPAN

MACHINE FOR MANUFACTURING TWIST DRILLS

Application filed September 24, 1929, Serial No. 394,880, and in Japan June 16, 1928.

This invention relates to improvements in or relating to a machine for manufacturing twist drills characterized by the fact that the drill blank, which is provided with longitudinal grooves parallel to the axis of the metallic blank rod, is held between two pairs of rollers connected in an electric circuit, and when electrically heated the blank is twisted while being drawn out. The object of the invention is to enable the manufacture of twist drills in a simple and economical manner without loss of the material of the blank.

In the accompanying drawings:

Figs. 1 to 5 illustrate diametrically the important parts of the new machine according to the invention, and in which Fig. 1 is an elevation of the rollers and their accessory parts;

Fig. 2 is an end view thereof;

Fig. 3 A and B are perspective views of two samples of the drill blanks;

Fig. 4 shows the drill blank held between front and rear pairs of rollers supplied with low voltage strong electric current;

Fig. 5 shows diagrammatically the temperature distribution of the drill blank when it is heated;

Fig. 6 is a plan view of a means for automatically regulating the supply of current according to the twisting resistance of the blank;

Fig. 7 is a sectional elevation of the means shown in Fig. 6;

Fig. 8 is a general elevational view of the machine according to the invention; and Fig. 9 is an end view of the machine shown in Fig. 8.

Referring to the drawings in detail, 1, 2, 3 and 4 are rollers having fixed shafts 5, 6, 7 and 8 respectively. The shafts 6 and 8 of the lower rollers 2 and 4 are mounted in members 6' and 8' fixed to a two part support 9 while the shafts 5 and 7 of the upper rollers 1 and 3 are mounted in members 5' and 7' movable in guides fixed to arms 10. These rollers 1 and 3 are vertically adjustable in the guides 11 by means of screws 12 and 13. The members 5' and 7' are provided with levers 14 and 15 each pivoted at one end to the guide 11 and having weight 23 at the free end, so that the upper rollers are tightly pressed against the steel rod or drill blank to maintain good contact between the lower rollers, the drill blank and the upper rollers. As shown in Fig. 4, one pair of the rollers 1 and 2 and the other pair of rollers 3 and 4 are respectively electrically connected in parallel through their shafts. 16 is an electric switch and a transformer arranged in a case 24 steps the current down to a low voltage strong current for the heating of the drill blank. Thus, when the switch 16 is closed, the current passes through the length of the drill blank between the contacting points of the blank and the two pairs of the rollers and heats the part to a desired extent.

Fig. 3 shows two examples of the drill blanks each of which is provided with two straight flutes S, say, by means of roll mill or by drop forging, the flutes being parallel to the axis of the blank.

17 is a rod for drawing out the drill blank and is provided with helical grooves 18 into which the teeth of guide members 21 and 22, 23a and 24a engage. 19 is a chuck provided at one end of the rod 17 to clamp the end of the drill blank while at the other end of the rod a handle wheel 20 is provided.

When a twist drill is manufactured by the machine described, the parts operate as follows.

The end of the drill blank A is clamped by the chuck 19 of the rod 17 and is inserted between the pairs of rollers 1, 2 and 3, 4. Low voltage strong current is supplied to the rollers by closing the switch 16. When the part of the drill blank between the pairs of the rollers is heated to a desired extent, the handle wheel 20 is rotated. By this operation, the rod 17 traverses from left to right in Fig. 1 while turning and therefore the heated part of the drill blank is twisted in exact accordance with the pitch of the helical groove 18 of the rod 17. The temperature distribution of the drill blank is somewhat as shown in Fig. 5 by shading in which the part between $a$ and $b$ is of highest temperature and accordingly softest because of the period of time required to raise the temperature of the material and the longitudinal movement of the latter. The part of the blank lying beyond the rollers 3 and 4 is gradually cooled and is harder than the shaded part. Therefore the twist always occurs in the part lying between $a$ and $b$ and the other part is not affected thereby. By slowly rotating the handle wheel 20 and accordingly drawing out the drill blank little by little, a desired twist corresponding to the helical groove 18 of the rod 17 can thus be very easily given to the blank so that the manufacture of the twist drill is greatly simplified.

Having completed the twisting operation, a slide piece 25 is moved towards the right on the rail 26, and the drill is replaced by a new blank when the slide piece 25 reaches to the right end of the rail 26. Holding this slide piece 25 at the right end of the rail 26, the handle 20 is turned clockwise to approach the guide 22 until it occupies a position in which the flutes S of the drill blank can just engage with the rollers. Then the slide piece 25 is returned to the left, the drill blank sliding between the pairs of rollers. Thus, the operation can be repeated without adjusting the vertical distance between the rollers of each pair for drill blanks of same dimensions.

When however drill blanks of different diameter are twisted, the vertical distance between the rollers of each pair must be adjusted and the center height of the chuck 19 must also be adjusted correspondingly. In order to adjust the height of the chuck 19, the parts 25 and 26 are supported by a vertically slidable member 27 which is moved by turning the screw bolt 27' by a suitable handle, the screw bolt being guided by a fixed arm 27'' the end of which forms a fixed nut for the bolt 27'.

The cross section of a twist drill of common type is not symmetrical and therefore the relative positions of upper and lower rollers of the pairs must be adjusted so that they are precisely coincided with the cross section of the drill. In order to achieve such adjustment, a handle 28 is provided and by turning this handle the arm 10 is moved and thereby the relative positions of the upper and lower rollers can be precisely adjusted. In this case, in order to bring the axis of the drill blank and that of the chuck 19 into exact alinement, a handle is applied to a screw bolt 29. By turning the bolt 29 the parts 25, 26 and those associated therewith are moved in a horizontal plane at right angles to the axis of the blank so that the axis of the chuck 19 is adjusted horizontally until it is in alinement with that of the drill blank.

A handle 31 connected with one part of the support 9 is operated to vary the horizontal distance between the two pairs of the rollers, while a suitable electric control 38 adjusts the quantity of current supplied to the rollers according to the diameter or material properties of the drill blank.

Also, according to this invention, a means for automatically regulating the quantity of current flowing the heated part of the drill blank is provided. This means is shown in Figs. 6 and 7. The handle 20 is rotatably mounted on the rod or shaft 17, the friction between the parts being minimized by a ball bearing 32. When the handle 20 is rotated counter-clockwise, if the twisting resistance of the drill blank is abnormal, a coiled spring 33 interposed between a member 17' fixed to the shaft 17 and a fixed projection 20' of the handle 20 is compressed and the extent of the compression is proportional to the twisting resistance of the drill blank. Then an end of the pin 34 pushes one end of a metallic lever 35 pivoted on a pin 38 to the member 17', so that the other end of the lever 35 is slid along a resistance unit 36 of arc shape towards the end $d$. When the lever 5 is electrically insulated by, say, using the member 17' and the pin 34 of the insulating material, and the lever 35 and the end $d$ of the resistance unit is connected to the circuit of the roller current, the current is increased as the twisting resistance is greater and accordingly the magnitude of the swing of the left arm of the lever 35 is greater. Thus, when the twisting resistance of the drill blank is abnormal, the more current is supplied to the heated part of the drill blank to soften the part until the twisting resistance becomes normal. A spring 37 acts to bring the arm of the left lever 35 to its normal position shown in the figure.

During the twisting operation, the surface of the rollers are inclined to be oxidized due to their contact with heated drill blanks at high temperature. Therefore it is preferable to supply cooling water to the shafts of the rollers.

As fully explained in the foregoing, the invention provides for the manufacture of twist drills with great ease and without preparatory cutting off of any material of high value of the blank. By finishing the product by a milling cutter or a grinder of any desired type, a finished product of twist drill can be manufactured with great saving of material.

We claim:

1. A machine for manufacturing twist drills comprising an electric circuit, two sets of rollers engageable in the grooves of a drill blank, the respective roller sets engaging the drill blank at different points in the length of the latter and being connected in said circuit whereby the portion of the drill blank interposed between the sets of rollers is heated incident to the passage of current therethrough, drill clamping and operating means.

2. A machine for manufacturing twist drills comprising an electric circuit, two sets of rollers engageable in the grooves of a drill blank, the respective roller sets engaging the drill blank at different points in the length of the latter and being connected in said circuit whereby the portion of the drill blank interposed between the sets of rollers is heated incident to the passage of current therethrough, and means for imparting twisting movement to the drill blank.

3. A machine for manufacturing twist drills comprising an electric circuit, two sets of rollers engageable in the grooves of a drill blank, the respective roller sets engaging the blank in relatively close relation with respect to the length of the blank and being connected in said circuit, drill clamping and operating means.

4. A machine for manufacturing twist drills comprising an electric circuit, two sets of rollers engageable in the grooves of a drill blank, the respective roller sets engaging the drill blank at different points in the length of the latter and being connected in said circuit whereby the portion of the drill blank interposed between the sets of rollers is heated incident to the passage of current therethrough, and means for imparting twisting movement to the drill blank, and means for effecting relative adjustment of the sets of rollers and the twisting means.

5. A machine for manufacturing twist drills comprising an electric circuit, two sets of rollers engageable in the grooves of a drill blank, the respective roller sets engaging the drill blank at different points in the length of the latter and being connected in said circuit whereby the portion of the drill blank interposed between the sets of rollers is heated incident to the passage of current therethrough, and means for imparting twisting movement to the drill blank, and a current regulating device interposed in said circuit and controlled by the twisting means to vary the current passing over said circuit in accordance with the resistance offered by the drill blank to twisting movement.

6. A machine for manufacturing twist drills comprising an electric circuit, two sets of rollers engageable in the grooves of a drill blank, the respective roller sets engaging the drill blank at different points in the length of the latter and being connected in said circuit whereby the portion of the drill blank interposed between the sets of rollers is heated incident to the passage of current therethrough, and means for varying the distance between the sets of rollers, drill clamping and operating means.

In testimony whereof we affix our signatures.

MASATOSI OKOCHI.
MAKOTO OKOSHI.